(12) United States Patent
Dow et al.

(10) Patent No.: US 9,635,160 B2
(45) Date of Patent: *Apr. 25, 2017

(54) COUPLING MOBILE DEVICES FOR TETHERLESS CHARGING OR COMMUNICATION

(71) Applicant: International Business Machines Corporation, Armonk, NY (US)

(72) Inventors: Eli M. Dow, Poughkeepsie, NY (US); James P. Gilchrist, Poughkeepsie, NY (US); Steven K. Schmidt, Essex Junction, VT (US); Charles J. Stocker, Plainsboro, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/854,068

(22) Filed: Sep. 15, 2015

(65) Prior Publication Data

US 2016/0381198 A1 Dec. 29, 2016

Related U.S. Application Data

(63) Continuation of application No. 14/753,226, filed on Jun. 29, 2015.

(51) Int. Cl.
*H04M 1/00* (2006.01)
*H04M 1/725* (2006.01)
*H02J 7/00* (2006.01)

(52) U.S. Cl.
CPC ......... *H04M 1/72527* (2013.01); *H02J 7/007* (2013.01); *H02J 7/0044* (2013.01); *H04M 1/72563* (2013.01)

(58) Field of Classification Search
CPC .. H04M 1/04; H04M 1/72527; H04M 1/7253; H04M 1/72575; H04M 2250/12;
(Continued)

(56) References Cited

U.S. PATENT DOCUMENTS

| 2009/0047989 A1* | 2/2009 | Harmon | G06F 1/1616 455/550.1 |
| 2010/0041333 A1* | 2/2010 | Ungari | H02J 7/00 455/41.2 |

(Continued)

OTHER PUBLICATIONS

Eli M. Dow, et al., "Coupling Mobile Devices for Tetherless Charging or Communication", U.S. Appl. No. 14/753,226, filed Jun. 29, 2015.

(Continued)

*Primary Examiner* — Shaima Q Aminzay
(74) *Attorney, Agent, or Firm* — Cantor Colburn LLP; Steven Chiu

(57) ABSTRACT

In one embodiment, a computer-implemented method includes detecting insertion of a mobile device into a cradle of a computer. The mobile device includes one or more device edges each having device coupling hardware. The cradle includes one or more cradle edges each having cradle coupling hardware. Each of the one or more device edges is configured to couple to a corresponding cradle edge of the one or more cradle edges, through connecting the device coupling hardware of the device edge with the cradle coupling hardware of the cradle edge. Communications are transmitted between a first device edge, of the one or more device edges, and a first cradle edge, of the one or more cradle edges, responsive to detecting the insertion. The communications are interpreted, by a computer processor, to utilize a touchscreen of the mobile device as a trackpad for the computer.

8 Claims, 4 Drawing Sheets

(58) Field of Classification Search
CPC ........ H02J 7/025; H02J 7/0004; H02J 7/0027; H02J 7/0044; H02J 7/0052
USPC .................. 455/550.1, 573, 41.1, 41.2, 41.3; 320/108; 359/254
See application file for complete search history.

(56) References Cited

U.S. PATENT DOCUMENTS

| | | | |
|---|---|---|---|
| 2011/0241614 A1* | 10/2011 | Yeh ...................... | H02J 7/0027 320/108 |
| 2014/0156772 A1* | 6/2014 | Eaton ...................... | H02J 7/025 709/206 |
| 2014/0253024 A1* | 9/2014 | Rautiainen .............. | H02J 7/025 320/108 |

OTHER PUBLICATIONS

List of IBM Patents or Patent Applications Treated as Related; (Appendix P), Filed Apr. 15, 2016; 2 pages.

* cited by examiner

COUPLING MOBILE DEVICES FOR TETHERLESS CHARGING OR COMMUNICATION

DOMESTIC PRIORITY

This application is a continuation of U.S. patent application Ser. No. 14/753,226, filed Jun. 29, 2015, the disclosure of which is incorporated by reference herein in its entirety.

BACKGROUND

Various embodiments of this disclosure relate to tetherless device coupling and, more particularly, to embedding mobile devices with tetherless charging or communication links.

Many users of consumer electronics have multiple devices, which may include laptop computers, mobile phones, tablets, and others. In some cases, tethers are needed to connect devices for the purpose of charging or communicating data. For instance, a universal serial bus (USB) cable may be used to charge a mobile device by way of a laptop's internal battery, and to transfer data between the two devices. Thus, many devices and their various charging cables may take up room in a user's physical workspace.

SUMMARY

In one embodiment of this disclosure, a computer-implemented method includes detecting insertion of a mobile device into a cradle of a computer. The mobile device includes one or more device edges each having device coupling hardware. The cradle includes one or more cradle edges each having cradle coupling hardware. Each of the one or more device edges is configured to couple to a corresponding cradle edge of the one or more cradle edges, through connecting the device coupling hardware of the device edge with the cradle coupling hardware of the cradle edge. Communications are transmitted between a first device edge, of the one or more device edges, and a first cradle edge, of the one or more cradle edges, responsive to detecting the insertion. The communications are interpreted, by a computer processor, to utilize a touchscreen of the mobile device as a trackpad for the computer.

In another embodiment, a system includes a computer having a cradle configured to receive a mobile device. The mobile device includes one or more device edges each having device coupling hardware. The cradle includes one or more cradle edges each having cradle coupling hardware. Each of the one or more cradle edges is configured to couple to a corresponding device edge of the one or more device edges, through connecting the cradle coupling hardware of the cradle edge with the device coupling hardware of the device edge. The computer is configured to receive communications from a first device edge, of the one or more device edges, at a first cradle edge, of the one or more cradle edges, responsive to detecting insertion of the mobile device into the cradle. The computer is configured to interpret the communications to utilize a touchscreen of the mobile device as a trackpad.

In yet another embodiment, a computer program product for coupling a mobile device to a computer includes a computer readable storage medium having program instructions embodied therewith. The program instructions are executable by a processor to cause the processor to perform a method. The method includes detecting insertion of a mobile device into a cradle of a computer. The mobile device includes one or more device edges each having device coupling hardware. The cradle includes one or more cradle edges each having cradle coupling hardware. Each of the one or more device edges is configured to couple to a corresponding cradle edge of the one or more cradle edges, through connecting the device coupling hardware of the device edge with the cradle coupling hardware of the cradle edge. Communications are transmitted between a first device edge, of the one or more device edges, and a first cradle edge, of the one or more cradle edges, responsive to detecting the insertion. The communications are interpreted to utilize a touchscreen of the mobile device as a trackpad for the computer.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are configured to couple a mobile device with a laptop computer, to enable charging of the mobile device while facilitating one or more communication channels between the laptop and the mobile device without use of a cable for tethering. As a result, a touchscreen of the mobile device may be used as the laptop computer's trackpad or display screen, or various other features of the mobile device may become available to the laptop computer.

Figure 1:
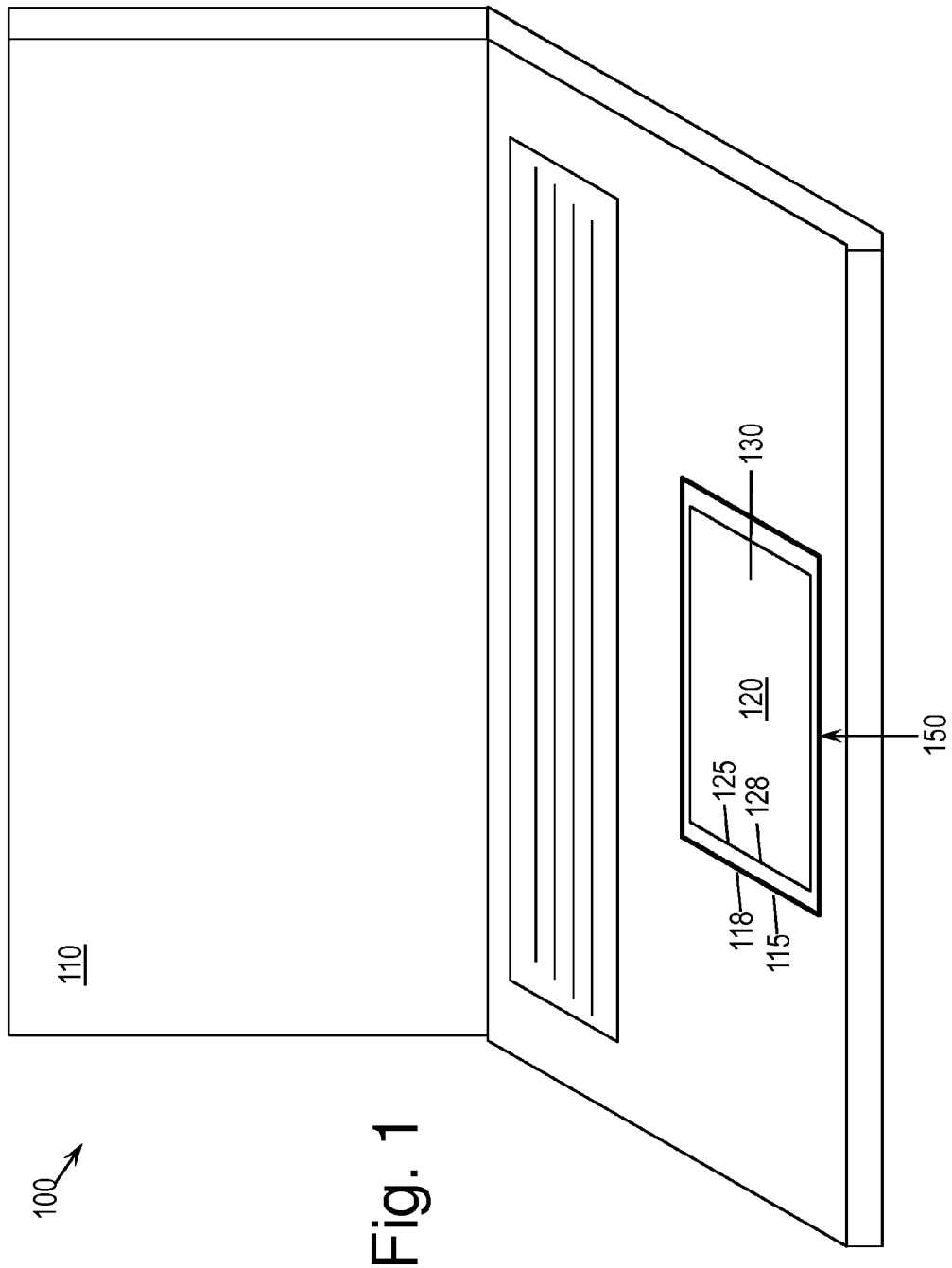
FIG. 1 is a diagram of a coupling system, according to some embodiments of this disclosure.

FIG. 1 is a diagram of a coupling system 100, according to some embodiments of this disclosure. As shown, the coupling system 100 may apply to a computer 110, such as a laptop computer, and a mobile device 120, such as a mobile phone or tablet. The mobile device 120 may include a touchscreen 130, which may be an integrated touch-sensitive display for receiving input at the mobile device 120. The mobile device 120 may also include a set of edges 125, also referred to herein as device edges, around the mobile device's exterior.

Unlike a traditional laptop computer, the computer 110 according to this disclosure may include a cradle 150 for receiving the mobile device 120. In some embodiments, the cradle 150 may be positioned in a convenient place for a trackpad. The cradle 150 may have a set of edges 115, also referred to herein as cradle edges, configured to align with the edges 125 of the mobile device 120 when receiving the mobile device 120. In some embodiments, the edges 115 of the cradle 150 may be adjustable, so as to enable to the cradle 150 to snugly fit various types of mobile devices 120, such that pairs of aligned edges 115 and 125 are in physical contact. For example, and not by way of limitation, the mobile device 120 may have four edges 125, which may each align with a corresponding one of the computer's four edges 115.

Generally, the coupling system 100 may enable the touchscreen 130 of the mobile device 120 to be used as a touch-sensitive trackpad for the computer 110, which need not have an integrated trackpad of its own. The coupling system 100 may also enable charging of the mobile device 120 by way of the computer's power supply. By connecting the mobile device 120 into the cradle 150 of the computer 110, use of the coupling system 100 may reduce the cost of the computer 110 by omitting trackpad-related hardware from the computer 110.

One or more pairs of aligned edges 115 and 125, where each pair includes an edge 125 of the mobile device 120 and a corresponding edge 115 of the cradle 150, may be communicatively coupled. This coupling may take various forms, for example, inductive coupling, physical coupling, or optical coupling. Each edge 125 of the mobile device 120 may include device coupling hardware 128, and each edge 115 of the cradle 150 may include cradle coupling hardware 118. The coupling between the various aligned edges 115 and 125 may be performed by way of this cradle coupling hardware 118 and device coupling hardware 128 of the aligned edges 115 and 125. In the case of inductive coupling, each edge 115 and 125 in a pair may be coupled by way of their cradle coupling hardware 118 and device coupling hardware 128 having good inductive resonance with inductive coils tuned to resonate at the same frequency. For physical coupling, each edge 115 and 125 in the pair may be in physical contact and configured to pass electrical signals between each other, by way of their cradle coupling hardware 118 and device coupling hardware 128 being configured to pass the electrical signals. For optical coupling, each edge 115 and 125 in the pair may be configured to transmit and receive optical signals, by way of the their cradle coupling hardware 118 and device coupling hardware 128 being configured with an optical transmitter and receiver and being physically close enough to transmit optical communications between each other. One of skill in the art will understand how to modify the edges of a conventional mobile device and a conventional cradle to provide suitable cradle coupling hardware 118 and device coupling hardware 128 so as to enable such coupling.

It will be understood that one or more pairs of edges 115 and 125 may be compatible edges, and thus configured for coupling, and that it is not necessary for all edges 125 of the mobile device 120 or all edges 115 of the cradle 150 to be compatible edges. Non-compatible edges need not include hardware enabling coupling between the computer 110 and the mobile device 120.

When the mobile device 120 is docked (i.e., inserted with edges 115 and 125 aligned) in the cradle 150, one or more edges 125 of the mobile device 120 may be coupled with corresponding edges 115 of the cradle 150, and each of such coupled edges 125 may be configured to receive an electrical charge or to transmit data communications. For example, and not by way of limitation, data communications may be transmitted between an edge 125 of the mobile device 120 and an edge 115 of the cradle 150 by one or more of ZigBee, WiFi, Bluetooth, optical protocols, personal area network technologies, and other wireless transmission or electrical protocols.

In some embodiments, one or more edges 125 may receive an electrical charge while one or more other edges 125 are used as communications channels when coupled to corresponding edges 115 of the cradle 150. More specifically, each coupled pair of edges 115 and 125 and their corresponding cradle coupling hardware 118 and device coupling hardware 128 may have a status or state, which may be an off state, a charging state, or a communication state. In the off state, no electrical charge or data communications may pass between the pair; in the charging state, an electrical charge may pass from the computer 110 to the mobile device 120, thus charging the mobile device 120; and in the communication state, data may pass back and forth between the computer 110 and the mobile device 120 over the connection. For example, and not by way of limitation, the mobile device 120 may have parallel batteries, and in that case, one pair of coupled edges 115 and 125 may be configured to charge each battery of the mobile device 120 (i.e., in the charging state), while remaining pairs of coupled edges 115 and 125 may be used as communication channels (i.e., in the communication state).

In some embodiments, each pair of edges 115 and 125 may be capable of being in each available state. When the mobile device 120 becomes docked in the cradle 150, one or both of the mobile device 120 and the computer 110 may detect the insertion of the mobile device 120 into the cradle 150. The computer 110 and the mobile device 120 may initially use one or more of the resulting couplings of a pair of edges 115 and 125 as a communication link to negotiate with each other to establish the state (e.g., off, charging, or communication) of each coupled pair of edges 115 and 125. In some embodiments, the computer 110 or the mobile device 120, or a combination of both, may determine during this negotiation which states will be used, such as by way of software designed to make such a determination. Each of the computer 110 and the mobile device 120 may then set each of its edges 115 and 125 to behave according to the determined state for that edge 115 or 125.

In some embodiments, the coupling system 100 or the computer 110 may have a standard mode and a power-saving mode, the latter of which may be activated automatically, for example, when the computer 110 is not plugged into a power outlet or is not receiving alternating current (AC) power or direct current (DC) power through a power cord. In the power-saving mode, the computer 110 may automatically disable (e.g., turn off) the coupling functionality of one or more of its edges 115, thus limiting the passing of electrical charge or data communications to and from the mobile device 120, and also reducing the computer's power consumption. To this end, the computer 110 may disable the cradle coupling hardware 118 of those one or more edges 115. In some embodiments, the computer 115 may communicate an indication of the power-saving mode to the mobile device 120, which may likewise disable its corresponding edges 125. The mobile device 120 may perform this disabling by disabling the device coupling hardware 128 of those corresponding edges 125.

Each communication link formed by a coupled pair of edges 115 and 125 may be a physical channel for communications in both directions. In some embodiments, this physical channel may be multiplexed, and thus, each physical communication channel may be used as two or more virtual communication channels.

Due to these communication channels, data may be passed back and forth between the mobile device 120 and the computer 110. More specifically, for example, input data describing input received at the touchscreen 130 may be passed to the computer 110 by way of one or more communication channels, virtual or physical, formed by the coupled edges 115 and 125. This input data may be interpreted by the mobile device 120 or by the computer 110, or both, thus enabling the computer 110 to use the input data as if it were received at an integrated trackpad.

In some embodiments, by way of communications between the computer 110 and the mobile device 120, various other features of the mobile device 120 may be available to the computer 110. For example, the mobile device 120 may include a step counter or an elevation counter. In that case, when the mobile device 120 is docked, the computer 110 may alter its interpretation of internal measurements to accurately gauge steps and stair-climbing. The mobile device 120 may include a fingerprint scanner or other biometric scanner, along with applicable recognition software. In that case, if the computer 110, the computer 110 may be configured to awake from sleep mode or hibernation upon receiving indication from the mobile device that valid biometric input (e.g., a valid fingerprint) has been entered at the mobile device 120. The mobile device 120 may include specialty hardware or software, such as face recognition or infrared sensors, to detect body proximity or, more specifically in the case of facial recognition, to detect proximity of particular faces. In that case, the computer 110 may remain awake or may wake up in the proximity of a body (e.g., fingers near the keyboard) or of a valid face. The mobile device 120 may include low-voltage specialty audio processors used for responding to voice commands, in some cases without waking the primary processor of the mobile device 120. In this case, due to communications between the computer 110 and the mobile device 120, the computer 110 may benefit from low-power voice-command reception and transcoding (e.g., into text). Further, in some embodiments, the computer 110 may initiate further voice processing through use of a cloud service.

Additionally, in some embodiments, the cradle 150 may have two coupling modes. In a first mode, as discussed above, the mobile device 120 may provide one or more means of input for the computer 110. In a second mode, however, the computer 110 may behave as a logical extension of the mobile device 120, under control of the mobile device's processor and storage. In other words, for example, a display and keyboard of the computer 110 may become a display and keyboard for the mobile device 120 in the second mode.

When the mobile device 120 is removed from the cradle 150, one or both of the mobile device 120 and the computer 110 may detect the removal. In that case, the computer 110 may disable its edges 125, such as by disabling the cradle coupling hardware 118 of each edge 115. Likewise, the mobile device 120 may disable its edges 125, such as by disabling the device coupling hardware 128 of each edge 125.

Figure 2:
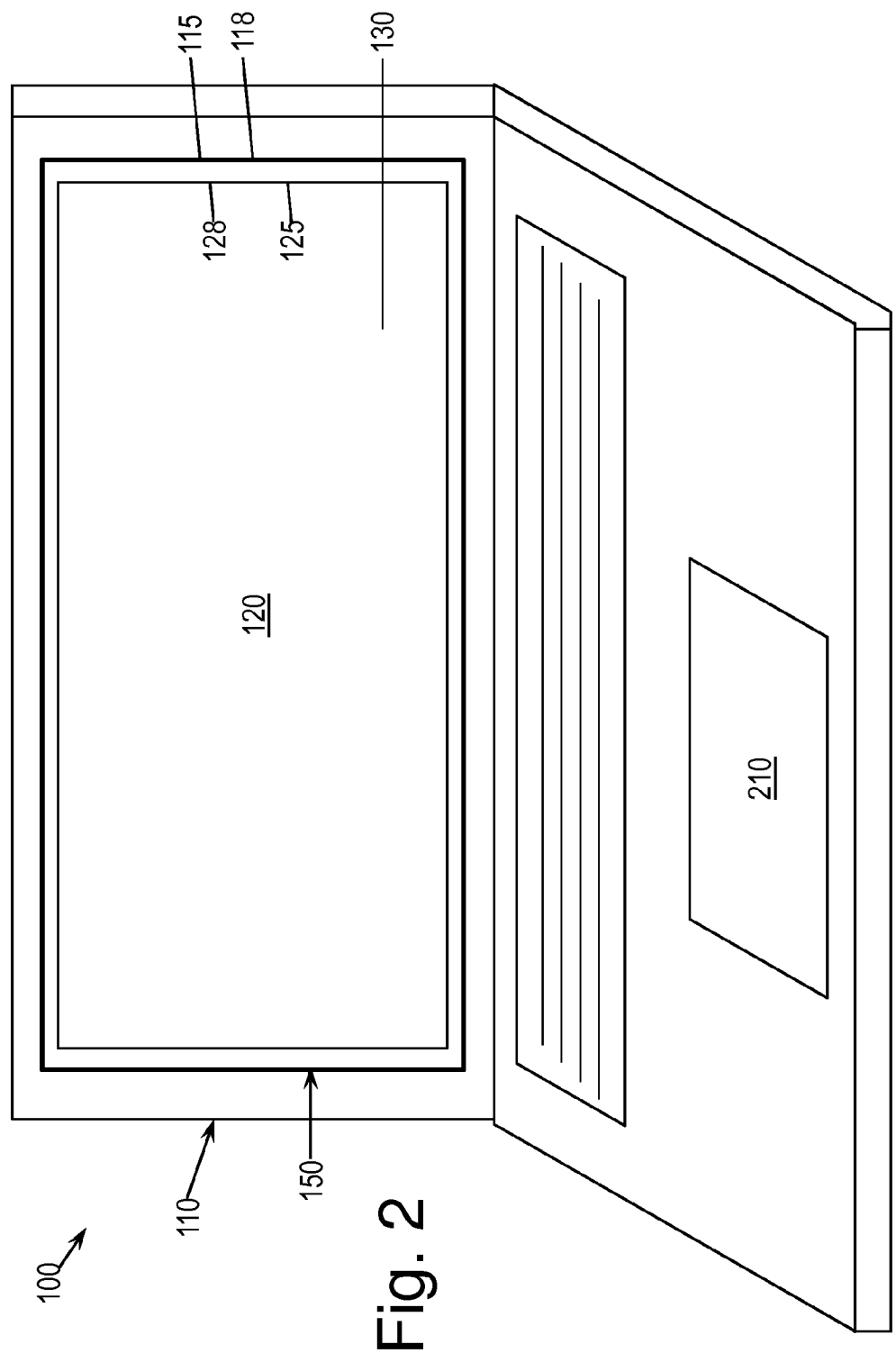
FIG. 2 is another diagram of the coupling system, according to some embodiments of this disclosure.

FIG. 2 is another diagram of the coupling system 100, according to some embodiments of this disclosure. As shown in FIG. 2, the cradle 150 of the computer 110 may be positioned where a display screen of the computer 110 might traditionally be placed. However, the computer 110 need not have a display screen of its own. In this case, the mobile device 120 used may be a tablet computer, for example.

When inserted into the cradle 150 such that one or more edges 125 of the mobile device 120 align with one or more edges 115 of the cradle 150, coupling between pairs of edges 115 and 125 may enable the mobile device 120 to be used as a touch-sensitive display screen for the computer 110. In other words, the mobile device 120 may behave as both a trackpad and a display screen. In this case, the computer may, but need not, have an integrated trackpad 210 in addition to the cradle 150, which may be especially convenient for users who are used to having a distinct trackpad and display screen.

Figure 3:
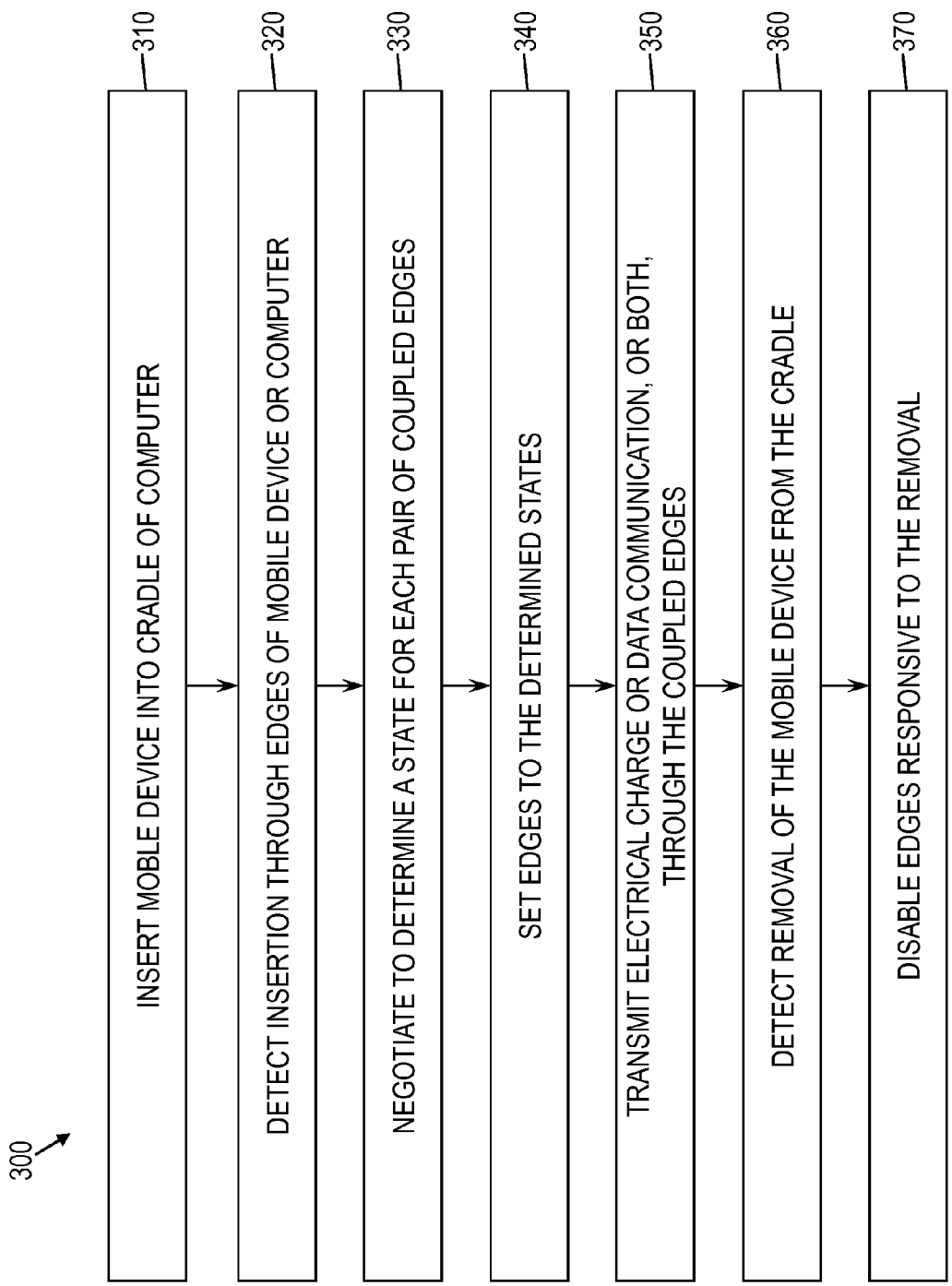
FIG. 3 is a flow diagram of a method for coupling devices, according to some embodiments of this disclosure.

FIG. 3 is a flow diagram of a method 300 for coupling devices, according to some embodiments of this disclosure. As shown, at block 310, a mobile device 120 may be inserted into the cradle 150 of the computer 110. At block 320, at least one of the computer 110 and the mobile device 120 may detect, through one or more of their edges 115 and 125, that the mobile device 120 is in the cradle 150. At block 330, the computer 110 and the mobile device 120 may negotiate to determine a state for each pair of coupled edges 115 and 125. At block 340, the computer 110 and the mobile device 120 may set their edges 115 and 125 to the appropriate states, as determined at block 330. At block 350, electrical charge, data communication, or both may pass through one or more of the coupled pairs of edges 115 and 125. At block 360, at least one of the computer 110 and the mobile device 120 may detect removal of the mobile device 120 from the cradle 150. At block 370, the computer 110 and the mobile device 120 may disable their edges 115 and 125 responsive to this removal.

Figure 4:
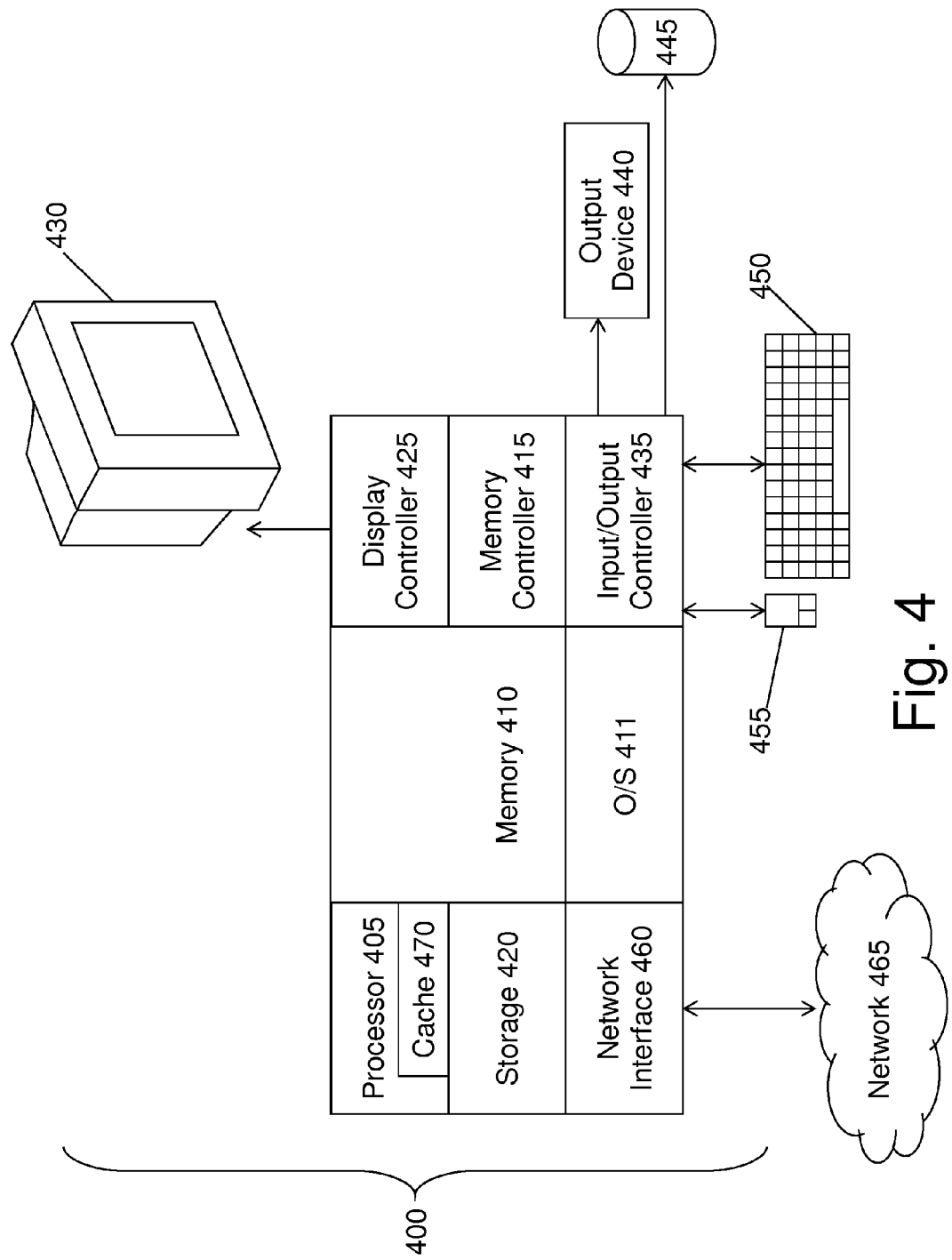
FIG. 4 is a block diagram of a computer system for implementing some or all aspects of the coupling system, according to some embodiments of this disclosure.

FIG. 4 illustrates a block diagram of a computer system 400 for use in implementing a coupling system or method according to some embodiments. The coupling systems and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For instance, the computer 110 or the mobile device 120, or both, may be a computer system 400 such as the one illustrated in FIG. 4.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the coupling systems and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Coupling systems and methods according to this disclosure may be embodied, in whole or in part, in computer program products or in computer systems 400, such as that illustrated in FIG. 4.

Technical effects and benefits of some embodiments include the ability to use a mobile device as a trackpad or a display screen of a computer. As a result, the computer may exclude an integrated trackpad or display screen, and the connection between the computer and the mobile device may also be used for charging the mobile device, thus reducing the need for tethering.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    detecting insertion of a mobile device into a cradle of a computer, the mobile device comprising one or more device edges each having device coupling hardware and the cradle comprising one or more cradle edges each having cradle coupling hardware, each of the one or more device edges configured to couple to a corresponding cradle edge of the one or more cradle edges through connecting the device coupling hardware of the device edge with the cradle coupling hardware of the cradle edge, wherein the computer does not have an integrated trackpad and wherein the cradle is positioned in a location of the computer to receive the mobile device to be used as the trackpad of the computer;
    transmitting communications between a first device edge, of the one or more device edges, and a first cradle edge, of the one or more cradle edges, responsive to detecting the insertion; and
    interpreting, by a computer processor, the communications to utilize a touchscreen of the mobile device as the trackpad for the computer.

2. The method of claim 1, wherein the mobile device is at least one of a mobile phone and a tablet computer.

3. The method of claim 1, further comprising negotiating between the computer and the mobile device to determine a state applicable to each of the one or more cradle edges and each of the one or more device edges, wherein each state is one of an off state, a charging state, and a communication state.

4. The method of claim 3, wherein a second cradle edge of the one or more cradle edges and a second device edge of the one or more device edges are in the charging state, and wherein the cradle coupling hardware of the second cradle edge is configured to pass an electrical charge to the mobile device through the device coupling hardware of the second device edge.

5. The method of claim 1, further comprising:
   detecting that the computer is not plugged into a power outlet;
   switching the computer into power-saving mode, responsive to the detecting; and
   disabling the cradle coupling hardware of a second cradle edge, responsive to the power-saving mode.

6. The method of claim 1, wherein the first device edge and the first cradle edge are coupled together by at least one of inductive coupling, physical coupling, and optical coupling.

7. The method of claim 1, further comprising interpreting the communications to utilize the touchscreen of the mobile device as a display screen for the computer.

8. The method of claim 1, further comprising:
   detecting removal of the mobile device from the cradle of the computer; and
   disabling the cradle coupling hardware of each of the one or more cradle edges, responsive to the removal.

\* \* \* \* \*